April 6, 1965 H. W. MITCHELL ETAL 3,177,490
NAVIGATION SYSTEM

Filed Dec. 16, 1960 3 Sheets-Sheet 1

INVENTORS'
HARRY W. MITCHELL
JEFF E. FREEMAN
BY John Gibson Semmes
ATTORNEY

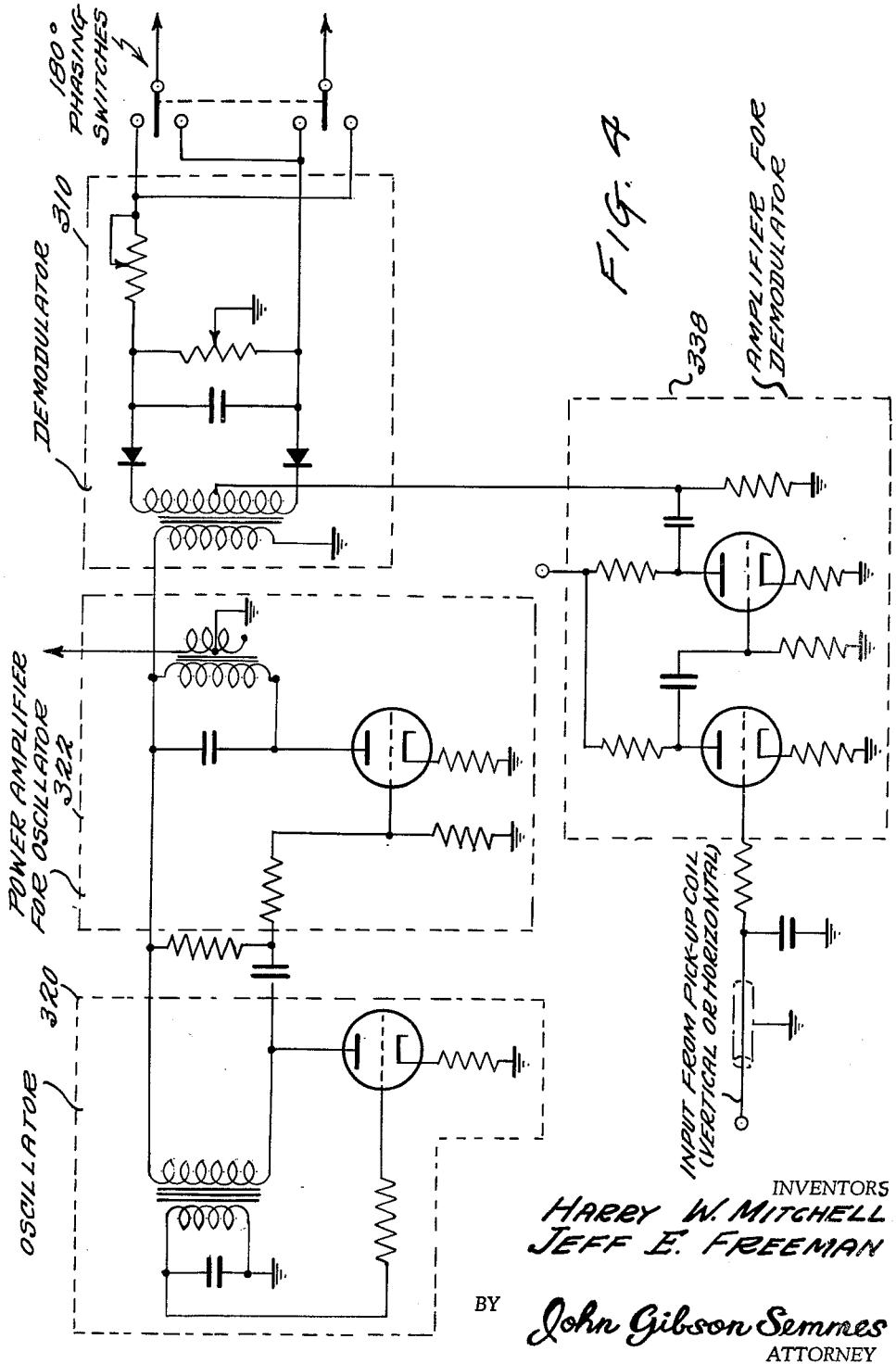

United States Patent Office 3,177,490
Patented Apr. 6, 1965

3,177,490
NAVIGATION SYSTEM
Harry W. Mitchell and Jeff E. Freeman, Fort Worth, Tex., assignors to Bell Aerospace Corporation, Wheatfield, N.Y., a corporation of Delaware
Filed Dec. 16, 1960, Ser. No. 76,251
6 Claims. (Cl. 343—112)

The present invention relates to navigational aids, and has particular adaptability to aeronautical navigation, wherein position information with respect to a desired course and specific check points as programmed may be converted into flight director information.

Whereas the invention may be defined with reference to any vehicular craft, at present it will be defined in terms of aircraft. In such craft, systems have been devised whereby the course and position of the aircraft may be determined by other means such as doppler radar or inertial guidance sensors, for example, and this information can be displayed to the pilot or navigator continuously in flight on a plotting board display. However, correlation of lateral displacement from a desired ground track and heading deviation (turn angle) from the desired ground track has hitherto been unavailable as a navigation aid. The purpose of this invention, therefore, is to utilize concurrently, flight path displacement information, as well as flight path direction information as obtained from a plotting board and display it to the pilot on a flight director instrument. The invention can be adapted as an improvement to Pilots Dead Reckoning Indictor (PDRI) manufactured as Part No.: F002300 by Daystrom Instrument—Division of Daystrom, Inc., Archbald, Pa. according to Specification No. NADEV-CENXAI—12-2 dated December 15, 1954. This system has been described as follows:

The Pilot's Dead Reckoning Indicator is a display device intended for use as a short-range navigational aid in aircraft equipped to furnish position and heading signals to the indicator. In use it may be portable or permanently attached, vertically or horizontally, in the cockpit of the aircraft. The display features include a translucent screen scribed with a grid of coordinates and a compass rose. Internally, a mechanism is driven by three servomotor systems in such a way that a lamp holder or bug can be positioned at any point or along any locus of points under the screen and within the boundaries of the enscribed grid. Two of the servo-motor systems accomplish this. The third servo-motor system is capable of rotating an element of the bug through 360 degrees so that the image of a spot and an arrow projected on the translucent screen can also turn to any direction. The location of the arrow image and its alignment relative to the grid represent then the possible position of the aircraft and its heading in the area of navigation identified with the grid coordinates of the screen.

It is an objective of invention therefore in navigation to convert travel path position information derived from plotting source into travel director information.

A further objective of invention resides in converting known plotting systems into a unitary position-direction recording and display instrument for a pilot in navigation.

The drawings include:

FIG. 1 wherein a plan view of servo plotting board and with associated track and check point information sources superposed;

FIG. 4 is a circuit diagram showing interconnection between respective components of FIG. 3.

Figure 2:
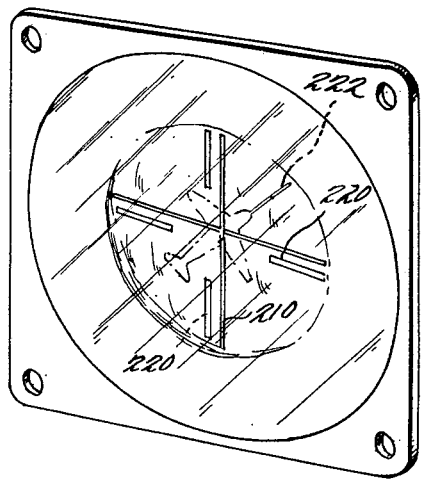
FIG. 2 is a conventional display device showing the position of a craft relative to a desired ground track in which lateral displacement from the ground track and heading deviation from the ground track will be displayed.
Figure 3:
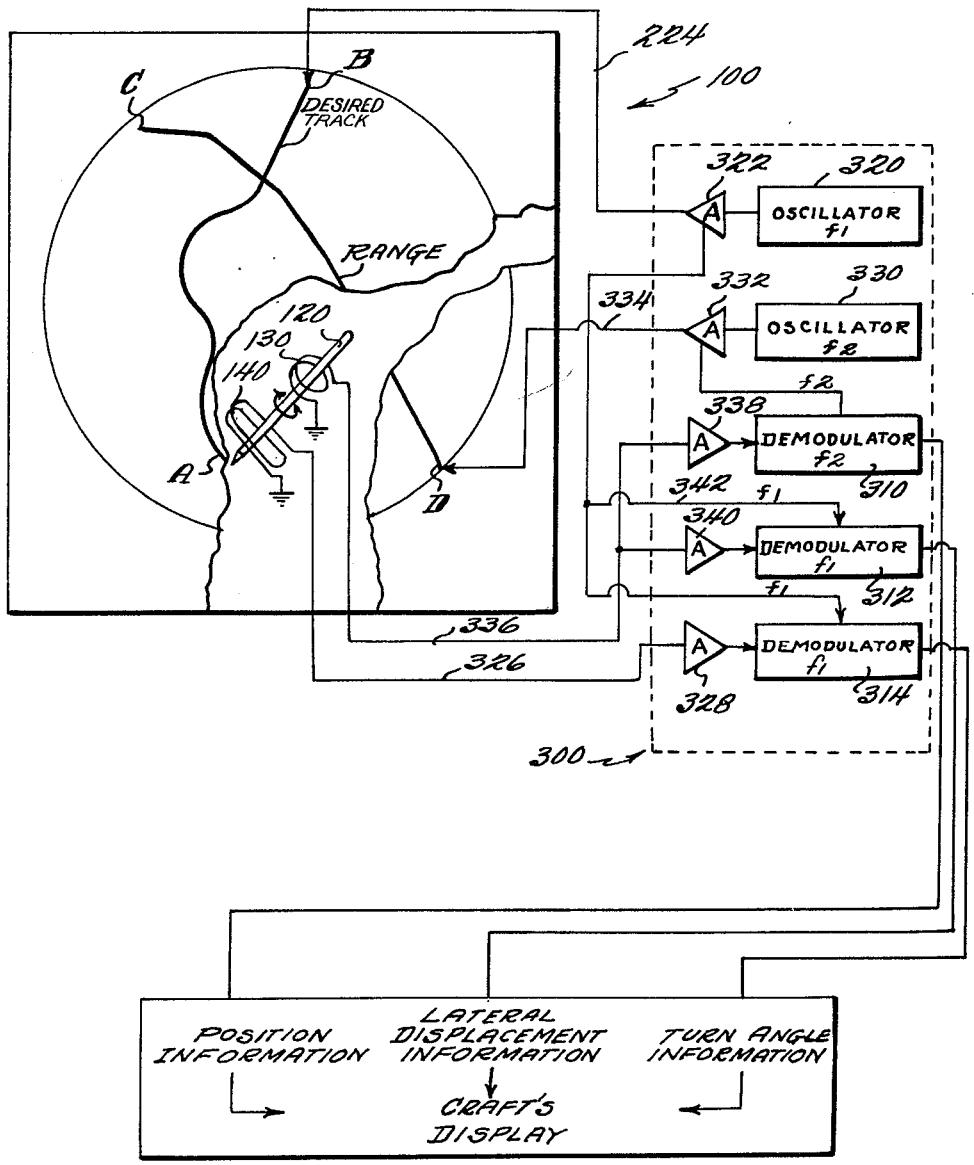
FIG. 3 is a schematic data flow diagram of the plotting system shown in FIG. 1 and the associated circuitry requisite to carrying out the invention.

As illustrated in FIG. 3, applicants' method provides for a coordinated display of vehicle proportional displacement off of a desired track, vehicle heading with respect to the desired track, and position information when specific pre-set check points are reached. Such a display can be used for short or long range navigational purposes. Conventional devices, such as illustrated in FIG. 2, have provided only for simultaneous display of turn angle and lateral displacement information as an interim pilot assistance. With the present invention, the pilot can fly a pre-selected circuitous ground track merely by flying the aircraft to keep command needles of FIG. 2 crossed on the center of the instrument face and to maintain the airplane representation parallel to the vertical needle.

Figure 1:
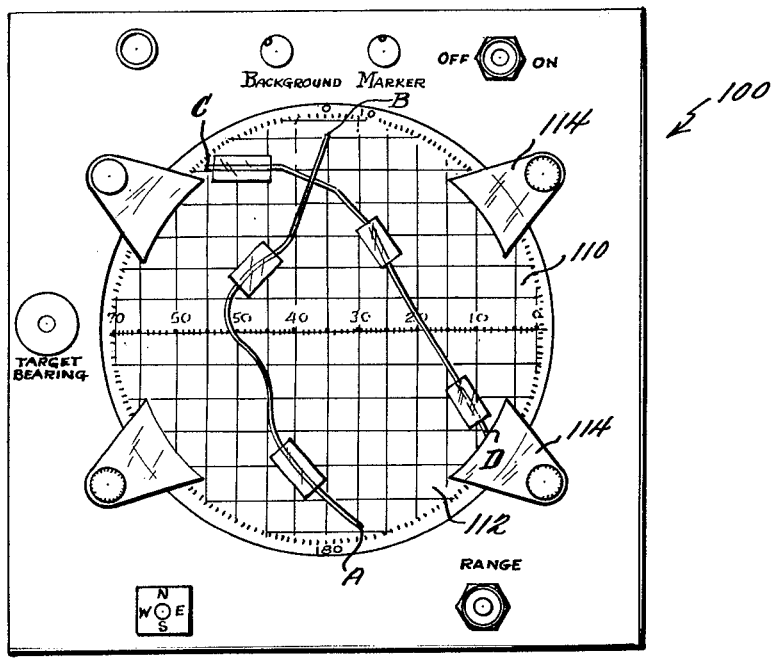

The components of invention include conventional plotting board 100 having overlay 110 superposed upon the screen as shown in FIG. 1. The track A–B comprises flexible, highly conductive and thin wire temporarily secured to the face of the board by transparent tape or other means, non conductive. Otherwise, the desired track path may be superposed upon the board by conductive ink and the like. This conductive track is positioned on the overlay along a desired course and with respect to known geographical landmarks that may be illustrated on the overlay. The check point media conductor C–D crossing the track A–B is likewise highly conductive and similarly positioned and attached. The intersection of C–D with A–B is positioned to mark a specific point along the desired course and a means is provided to actuate a marker beacon or similar position light on the pilot's display panel when the plotting board stylus reaches this intersection. As shown in FIG. 1, A–B and C–D should intersect at substantially 90° so that signals from C–D will not be introduced prematurely as might be the case if C–D were to extend parallel and adjacent A–B. Other than this consideration and the desired location of the point of intersection, the positioning, that is, angle, length, etc., of C–D, is not significant. For each given course, a new or reset overlay may be handily attached to the plotting board. In each instance, the pilot would have preset track and check point sources as desired.

Referring to FIG. 2, the display component 200 includes directional cross hairs 210 and 220 and the craft simulator 222 electronically controlled through the demodulated signals picked up by the stylus or aforementioned mechanism and bug with respect to the range media within the servo positioned plotting board.

Referring now to FIG. 3, plotting board 100 includes stylus 120 having X, Y and compass inputs thereto such as found in known commercially available servo position plotting boards and movable beneath such plotting boards. In the invention, however, the stylus is associated in connection with the stylus coils 130 and 140, the respective stylus and coils being united for movement responsive to compass command. The coil 130 is a pick-up coil vertically polarized, whereas its counterpart 140 is a pick-up coil which is horizontally polarized, the same being mounted on the stylus moving under the plotting board overlay to X and Y inputs.

In connection with the respective track media A–B and check point media C–D, power amplifier current having frequency $f1$ excites the connected track conductor A–B where through interconnection with demodulator 314, turn angle (directional) information may be applied to the ship's display activating device 300 as will be more fully explained hereinafter. Such excitation originates in the $f1$ oscillator and power amplifier 320 and 322 respectively, said excitation being picked up by the respective induction coils 130 and 140 mounted upon stylus 120, the latter of which is rotatably positioned by vehicle heading.

As will be apparent, the conductor C–D being the check point information source is excited in operation by a current having a frequency of $f2$ through the action of oscillator 330, amplifier 332. In operation, coil 130 picks up check point position information induced from the C–D conductor excited as aforesaid. In practice, this vertically polarized coil 130 applies check point information to $f2$ frequency amplifier 338 associated with the demodulator 310 via conductor 336. The output of this circuit may be used for marker beacon or distance information. The coil 130 will be in a position to pick up a signal from the check point media C–D only when the stylus 120 is close to C–D and thus, as long as the stylus 120 is along the track A–B, only when the stylus 120 is near the intersection between the media A–B and the media C–D. Accordingly, when a signal is picked up by the coil 130 of a strength indicating that the stylus 120 is at the point of intersection, that signal can activate a light or other indication to the pilot that this position along the track A–B has been attained. Obviously a number of position check point medias such as the one C–D illustrated can be employed so that a series of check points can be signalled to the pilot. The $f1$ amplifier 340 being interconnected to conductor 336 is also energized when the coil 130 which is vertically polarized is in position other than centered under the desired track. A voltage is thus brought to amplifier 340, amplified and applied to the demodulator 312 and referenced via conductor 342 to the $f1$ oscillator 320, the output thereof being a plus or minus D.C. voltage, representing the amount and direction the said vehicle is "off" laterally from the desired track, as expressed through display activating device illustrated in FIG. 3.

With respect to obtaining turn angle information, in FIG. 3 attention is directed to the stylus 120 and horizontally polarized coil 140. The respective coils, each being fixed to the stylus, rotate simultaneously as the vehicle heading may vary simultaneously. Accordingly, where craft or vehicle and track headings coincide a null will be obtained from said coil. Otherwise, the $f1$ frequency output is applied via conductor 326 to the $f1$ amplifier 328, applied to $f1$ demodulator 314 (the demodulator being interconnected with $f1$ amplifier 322), whereby plus or minus D.C. voltage equivalent to heading error between vehicle heading and desired heading is obtained, and recorded on the display.

We claim:

1. In combination with a servo plotting board having a movable stylus whose lateral and angular position relative to said plotting board is determined by X, Y and compass inputs, a navigational system comprising:
   means for applying an indicator signal along said plotting board to indicate a desired track for said craft,
   polarized pick-up means connected to said stylus and coupled to said indicator signal to provide an information signal indicating deviation from said track.

2. In combination with a servo plotting board having a movable stylus, the lateral and angular position of said stylus relative to said board being determined by X, Y and compass inputs, a navigational system comprising:
   a conductive media on said plotting board to designate a pre-determined desired track,
   means for energizing said media with an A.C. signal,
   first pick-up means mounted to said stylus and coupled to said A.C. signal to provide a first information signal indicating lateral displacement of said stylus from said media,
   second pick-up means mounted to said stylus and coupled to said A.C. signal to provide a second information signal indicating turn angle deviation from the heading defined by said media.

3. In combination with a servo plotting board having a movable stylus, the lateral and angular position of said stylus relative to said board being determined by X, Y and compass inputs, a navigational system comprising:
   a conductive media on said plotting board to designate a pre-determined desired track,
   means for energizing said media with a signal having pre-determined frequency,
   a first pick-up coil coupled to said signal and mounted to said stylus, said pick-up coil being polarized in a first direction with respect to said stylus to provide a first information signal indicating lateral displacement of said stylus from said media, and
   a second pick-up coil coupled to said signal and mounted to said stylus, said second pick-up coil being polarized in a second direction with respect to said stylus to provide a second information signal indicating turn angle deviation from the heading defined by said media.

4. In combination with a servo plotting board having a movable stylus, the lateral and angular position of said stylus relative to said board being determined by X, Y and compass inputs, a navigational system comprising:
   a first conductive media on said plotting board to designate a pre-determined desired track,
   a second conductive media on said plotting board intersecting said first conductive media to designate a pre-determined check point position at the intersection of said media,
   means for energizing said first media at a first frequency,
   means for energizing said second media at a second frequency,
   a vertically polarized pick-up coil mounted on said stylus to provide a first information signal at said first frequency indicating lateral displacement of said stylus from said first media and to provide a second information signal at said second frequency indicating proximity to said check point position, and
   a horizontally polarized pick-up coil mounted on said stylus to provide a third information signal at said first frequency indicating turn angle deviation from the heading defined by said media.

5. In combination with a servo plotting board having a movable stylus whose lateral and angular position relative to said board is determined by X, Y and compass inputs, a navigational system comprising:
   a conductive media on said plotting board to designate a pre-determined desired track,
   means for energizing said media with a signal having a pre-determined frequency,
   a vertically polarized pick-up coil mounted on said stylus and movable therewith, said coil being coupled to said signal to pick up a first information signal of said pre-determined frequency indicating lateral displacement of said stylus from said media,
   a horizontally polarized pick-up coil mounted on said stylus and movable therewith, said horizontally polarized coil being coupled to said signal to pick up a second information signal of said pre-determined frequency indicating turn angle deviation from the heading defined by said media,
   first demodulation means adapted to demodulate a signal of said pre-determined frequency and having as its input said first information signal to provide a lateral displacement information signal adapted to bias a display, and
   second demodulation means adapted to demodulate a signal of said pre-determined frequency and having as its input said second information signal to provide a turn angle information signal adapted to bias a display.

6. In combination with a servo plotting board having a movable stylus whose lateral and angular position relative to said board is determined by X, Y and compass inputs, a navigational system comprising:
   first conductive media on said plotting board to designate a pre-determined desired track, second conductive media on said plotting board intersecting said first conductive media to designate a predetermined desired check point position at the intersection along said track, means for energizing said first media at a first frequency, means for energizing said second media at a second frequency, a vertically polarized pick-up coil mounted on said stylus and movable therewith to pick up a first information signal of said first frequency indicating lateral displacement of said stylus from said first media and to pick up a second information signal of said second frequency when said stylus is in the vicinity of said second conductive media, a horizontally polarized pick-up coil mounted on said stylus and movable therewith to pick up a third information signal of said first frequency indicating turn angle deviation from the heading defined by said first media, first demodulation means adapted to demodulate a signal of said first frequency and having as its input said first information signal to provide a lateral displacement information signal adapted to bias a display, second demodulation means adapted to demodulate a signal of said first frequency and having as its input said third information signal to provide a turn angle information signal adapted to bias a display, and third demodulation means adapted to demodulate a signal of said second frequency and having as its input said second information signal to provide a check point position indication signal.

References Cited by the Examiner
UNITED STATES PATENTS

| | | |
|---|---|---|
| 2,339,291 | 1/44 | Paulus et al. |
| 2,835,858 | 5/58 | Moseley. |
| 2,859,426 | 11/58 | Davis _____ 340—22 |

CHESTER L. JUSTUS, *Primary Examiner.*

KATHLEEN H. CLAFFY, *Examiner.*